United States Patent
Sakamoto et al.

(10) Patent No.: US 8,372,385 B2
(45) Date of Patent: Feb. 12, 2013

(54) ANTIFOULING CONDENSATION CURING ORGANOPOLYSILOXANE COMPOSITION, MAKING METHOD, AND UNDERWATER STRUCTURE

(75) Inventors: Takafumi Sakamoto, Annaka (JP); Tokuo Sato, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 676 days.

(21) Appl. No.: 12/249,144

(22) Filed: Oct. 10, 2008

(65) Prior Publication Data

US 2009/0110658 A1 Apr. 30, 2009

(30) Foreign Application Priority Data

Oct. 29, 2007 (JP) ................. 2007-280155

(51) Int. Cl.
*A01N 55/10* (2006.01)

(52) U.S. Cl. ........ 424/78.09; 424/408; 523/122; 524/267; 524/268; 524/731; 524/858; 524/863; 525/477; 528/10; 528/12; 528/33; 528/34; 528/35; 528/43

(58) Field of Classification Search ............. None
See application file for complete search history.

(56) References Cited

U.S. PATENT DOCUMENTS

| | | | |
|---|---|---|---|
| 5,218,059 A | 6/1993 | Kishihara et al. | |
| 5,904,988 A * | 5/1999 | Stein et al. | 428/447 |
| 5,958,116 A | 9/1999 | Kishihara et al. | |
| 7,297,745 B2 | 11/2007 | Amidaiji et al. | |
| 7,456,246 B2 * | 11/2008 | Kamohara et al. | 528/43 |
| 7,468,399 B2 * | 12/2008 | Sakamoto et al. | 523/122 |
| 2006/0258818 A1 | 11/2006 | Kimura et al. | |

FOREIGN PATENT DOCUMENTS

| | | |
|---|---|---|
| EP | 1 215 252 A2 | 6/2002 |
| EP | 1 518 905 A1 | 3/2005 |
| JP | 56-76452 | 6/1981 |
| JP | 56-76453 | 6/1981 |
| JP | 58-13673 | 1/1983 |
| JP | 62-84166 | 4/1987 |
| JP | 2503986 | 4/1996 |
| JP | 10-316933 | 12/1998 |
| JP | 2952375 | 7/1999 |
| JP | 2001-139816 | 5/2001 |
| JP | 2001-181509 | 7/2001 |

* cited by examiner

*Primary Examiner* — Neil Levy

(74) *Attorney, Agent, or Firm* — Oblon, Spivak, McClelland, Maier & Neustadt, L.L.P.

(57) ABSTRACT

An antifouling condensation curing organopolysiloxane composition is prepared by premixing a part or all of (A) a diorganopolysiloxane free of a reactive group with a part or all of (B) silica to form a premix, then mixing the premix with the remainder of (A) and (B), (C) a base diorganopolysiloxane, and (D) a silane. The composition has a good balance of low viscosity and high thixotropy, can be thickly coated in a single pass, and cures into a coating having rubber strength and surface smoothness and exhibiting satisfactory antifouling property over a long period of time.

10 Claims, No Drawings

ANTIFOULING CONDENSATION CURING ORGANOPOLYSILOXANE COMPOSITION, MAKING METHOD, AND UNDERWATER STRUCTURE

CROSS-REFERENCE TO RELATED APPLICATION

This non-provisional application claims priority under 35 U.S.C. §119(a) on Patent Application No. 2007-280155 filed in Japan on Oct. 29, 2007, the entire contents of which are hereby incorporated by reference.

TECHNICAL FIELD

This invention relates to room temperature-vulcanizable organopolysiloxane compositions suitable as a coating material and more particularly, to antifouling RTV organopolysiloxane compositions which can be spray coated effectively and thickly in a single pass and hence require a reduced period of coating operation, and produce a coating of uniform thickness having improved film strength, film hardness and rubber physical properties and exhibiting a long-term antifouling capability. The compositions are applied to underwater structures (e.g., ships, harbor facilities, buoys, pipe lines, bridges, submarine stations, submarine oil well excavation units, power plant water conduits, fish culture nets and fixed shore nets) to form antifouling coatings suitable for preventing aquatic organisms from depositing and growing on their surface. It also relates to an underwater structure coated with the composition.

BACKGROUND ART

Known in the art are a variety of room temperature-vulcanizable (RTV) silicone rubber compositions which cure into rubbery elastomers at room temperature. Rubbers resulting from such RTV compositions have improved weather resistance, durability, heat resistance and freeze resistance as compared with other organic rubbers and are thus used in a wide variety of fields. Especially in the building field, RTV compositions are often used for the bonding of glass plates, the bonding of metal and glass, the sealing of concrete joints and the like. Recently, RTV compositions newly find wide use as coating material for buildings, plants, water conduits (inclusive of inner and outer surfaces) and the like.

The organopolysiloxanes on which RTV compositions are based, however, are susceptible to electrostatic charging and thus likely to adsorb air-borne dust. This is problematic in that surfaces of cured sealing or coating materials are markedly fouled with the lapse of time, losing aesthetic appearance. One typical solution to this problem is by adding or incorporating surfactants having a polyoxyethylene group, sorbitan residue or disaccharide residue to RTV (see JP-A 56-76452 and JP-A 56-76453). To achieve fully satisfactory results by the above method, the surfactants must be added in large amounts, undesirably degrading the adhesion which is one important function of RTV sealing or coating materials.

Once underwater structures are installed or in service, aquatic organisms living in waters like sea and rivers such as barnacle, lamp chimney, serpula, mussel, Bryozoa, and seaweeds (e.g., Enteromorpha and Ulva) deposit and grow on splashed and submerged surface areas, causing various damages. In the case of a ship, for example, the deposition of organisms to the hull increases frictional resistance to water to reduce the speed. The fuel consumption must be increased to maintain a certain speed, which is uneconomical. If organisms deposit on structures of a harbor facility which are fixed at or below the water surface, it becomes difficult for the structures to exert their own function and sometimes, their substrates can be eroded. If organisms deposit on fish culture nets or fixed shore nets, net openings are clogged, eventually leading to the death of fishes.

Conventional means for preventing deposition and growth of aquatic organisms on underwater structures is the application to such structures of antifouling paints having incorporated therein toxic antifouling agents such as organotin compounds and cuprous oxide. Although such antifouling paints are effective for substantially preventing deposition and growth of aquatic organisms, the use of toxic antifouling agents is harmful to the environmental safety and hygiene during preparation and application of paints. Additionally, the toxic antifouling agent is slowly leached out of the coating in water, with the risk of contaminating the surrounding water area over a long term. For this reason, the use of toxic antifouling agents was legally banned.

There have been proposed paint compositions which are effective for preventing deposition and growth of aquatic organisms, but free of toxic antifouling agents. Paint compositions which are designed to impart antifouling property by reducing the surface tension of coatings include non-toxic antifouling paint compositions comprising RTV and liquid paraffin or petrolatum (see JP-A 58-13673 and JP-A 62-84166). Japanese Patent Nos. 2,503,986 and 2,952,375 disclose non-toxic antifouling paint compositions comprising a reaction curing silicone resin and a less compatible, non-reactive, polar group-containing silicone resin wherein under the impetus of volume shrinkage associated with curing of the reaction curing silicone resin, the polar group-containing silicone resin bleeds out of the surface, which cooperates with the low surface tension of reaction curing silicone resin, to exhibit anti-fouling property. These non-toxic anti-fouling paint compositions, however, suffer from environmental safety and hygiene problems because the less compatible, non-reactive, polar group-containing silicone resin serving as bleed oil is a polyoxyethylene group-containing silicone resin in which ethylene oxide or propylene oxide is added to a silicon atom via a C—C bond or a silicone resin having an alkoxy group bonded to a silicon atom at a molecular end via an ethylene oxide or propylene oxide group.

In these RTV compositions, hydrophilic silica or hydrophobic silica (which has been surface treated with dimethyldichlorosilane, hexamethyldisilazane or the like) is incorporated in order for the compositions to fully exert cured properties such as surface smoothness and rubber strength. However, hydrophilic silica has a poor affinity to silicone oil so that silica and analogous fillers agglomerate in the curable silicone rubber compositions. Such compositions cure into rubbers with less satisfactory properties. On the other hand, hydrophobic silica has a good affinity to silicone oil, little agglomeration in such compositions, relatively good dispersion, and relatively good thixotropy, so that formation of a thick film coating on a vertical surface in a single pass is expectable. The hydrophobic silica-loaded compositions, however, are too viscous to spray-coat, and when diluted with solvents, experience a sudden loss of thixotropy, resulting in coatings sagging down or losing smoothness.

A blend of two silicone rubbers with different viscosities is proposed in JP-A 10-316933 as means for ensuring a cured buildup despite solvent dilution. Since only hydrophobic silica is used in this composition, the requirements of low viscosity, high strength and high thixotropy are not met at the same time. Then surface smoothness is not available. The composition fails to form a coating with a luster surface.

Besides, JP-A 2001-139816 discloses a curable composition comprising an organopolysiloxane having condensation reaction functional groups at both ends of its molecule and hydrophobic silica, and JP-A 2001-181509 discloses a curable composition comprising an organopolysiloxane having condensation reaction functional groups at both ends of its molecule, hydrophobic silica, and hydrophilic silica. These compositions offer a low viscosity, high strength and high thixotropy, but fail in causing the incompatible, non-reactive (partially reactive) silicone resin to bleed out on the coating surface. The antifouling property that coatings of these coating compositions provide largely depends on the release with time of the active ingredient (silicone oil), indicating that the antifouling property is substantially reduced at the end of release of the active ingredient. It is then difficult to maintain antifouling property over a long period of time.

DISCLOSURE OF THE INVENTION

An object of the invention is to provide a method of preparing an antifouling condensation curing organopolysiloxane composition which has a good balance of low viscosity and high thixotropy, can be thickly coated in a single pass, and cures into a coating having rubber strength and surface smoothness and exhibiting satisfactory antifouling property over a long period of time. Another object is to provide the composition prepared by this method and an underwater structure coated with the cured composition.

Studying how to prepare a composition, the inventors have discovered that by premixing a filler with an incompatible, non-reactive silicone resin, thus treating the filler, a silicone resin composition having a low viscosity, high strength and high thixotropy is obtained and that the silicone rubber composition cures into a coating which allows the non-reactive silicone resin to bleed out on the coating surface and remains antifouling over time.

More particularly, the inventors sought for a coating composition which has a good balance of low viscosity and high thixotropy and which cures into an antifouling coating exhibiting satisfactory antifouling property over a long period of time and allowing any adhering organisms to be readily removed. The inventors studied how to allow non-reactive silicone resins commonly used as the bleed oil component such as oxyalkylene-modified silicones, methylphenylsilicone and dimethyldiphenylsilicone to efficiently bleed out on coating surface.

Through experiments, the inventors have found that treatment of filler surface with a bleed oil component facilitates more efficient bleed-out of the bleed oil component than the prior art treatment with a hydrolyzable silicone resin serving as the base polymer. This is because the bleed oil component in the interior finds a way to the coating surface by traveling along the bleed oil-treated filler surfaces. The composition prepared by the method exhibits a low viscosity and a high thixotropy and forms a cured coating having improved rubber strength and surface smoothness. The resultant RTV organopolysiloxane composition is effective in preventing aquatic organisms from adhering to and growing on the surface of underwater structures and maintains the effect over a long period of time.

The present invention pertains to an antifouling condensation curing organopolysiloxane composition comprising (A) a diorganopolysiloxane having a substituted or unsubstituted monovalent hydrocarbon group, free of a silicon atom-bonded condensation cure reactive group, (B) silica, (C) a diorganopolysiloxane having at least two silicon atom-bonded hydroxyl and/or hydrolyzable groups in a molecule, and (D) a silane having at least two hydrolyzable groups in a molecule and/or a partial hydrolytic condensate thereof.

In one aspect, the invention provides a method for preparing the composition, comprising the steps of premixing a part or all of component (A) with a part or all of component (B), preferably at a temperature from 50° C. to less than the decomposition temperature of component, specifically 50 to 300° C., to form a premix, then mixing the premix with the remainder of component (A), the remainder of component (B), components (C) and (D).

In another aspect, the invention provides an antifouling condensation curing organopolysiloxane composition which has been prepared by the same method.

Also contemplated herein is an underwater structure coated with the antifouling condensation curing organopolysiloxane composition in the cured state.

BENEFITS OF THE INVENTION

The anti-fouling condensation curing organopolysiloxane composition prepared by the method of the invention has a good balance of low viscosity, high thixotropy and the like, and can be applied as a thick film in a single pass. The cured coating obtained therefrom also has a good balance of rubber strength, surface smoothness and the like. When the composition is used as a coating material or paint, there are obtained many advantages including effective spray coating, formation of a thick film in a single pass, a reduced duration of coating, and formation of a film with uniform surface. In addition, the coating film has good film strength and hardness. When the composition is used as an antifouling paint, the resulting coating provides excellent antifouling property over a long period of time. Particularly when the composition is applied to an underwater structure, the coating is effective in preventing aquatic organisms from adhering to or growing on the surface of the underwater structure and maintains the effect over time.

Coatings of the anti-fouling condensation curing organopolysiloxane composition are non-toxic, effective in preventing aquatic organisms from adhering to or growing on the substrate surface, and fully antifouling.

DESCRIPTION OF THE PREFERRED EMBODIMENT

The antifouling condensation curing organopolysiloxane composition of the invention is defined as comprising in admixture, components (A) to (D):

(A) a diorganopolysiloxane having a substituted or unsubstituted monovalent hydrocarbon group, free of a silicon atom-bonded condensation cure reactive group, (B) silica, (C) a diorganopolysiloxane having at least two silicon atom-bonded hydroxyl and/or hydrolyzable groups in a molecule, and (D) a silane having at least two hydrolyzable groups in a molecule and/or a partial hydrolytic condensate thereof.

Component A

In the antifouling condensation curing organopolysiloxane composition of the invention, the diorganopolysiloxane serving as component (A) is a non-reactive resin (bleed oil component) without condensation curing reactivity. It may be any non-reactive (or non-condensation reactive) silicone oil which can bleed out of the cured composition.

Suitable examples include, but are not limited to, dimethylsilicone oil in which all groups are methyl, and modified forms of dimethylsilicone oil such as, for example, methylphenylsilicone oil in which some methyl groups are replaced by phenyl groups, amino-modified silicone oil in which some methyl groups are replaced by monoamine, diamine or amino-polyether groups, epoxy-modified silicone oil in which some methyl groups are replaced by epoxy, alicyclic epoxy, epoxy-polyether or epoxy-aralkyl groups, carbinol-modified silicone oil in which some methyl groups are replaced by carbinol groups, mercapto-modified silicone oil in which some methyl groups are replaced by mercapto groups, carboxyl-modified silicone oil in which some methyl groups are replaced by carboxyl groups, methacryl-modified silicone oil in which some methyl groups are replaced by methacrylic groups, polyether-modified silicone oil in which some methyl groups are replaced by polyether or polyether-long chain alkyl-aralkyl groups, long chain alkyl-modified silicone oil in which some methyl groups are replaced by long chain alkyl or long chain alkyl-aralkyl groups, higher fatty acid-modified silicone oil in which some methyl groups are replaced by higher fatty acid ester groups, and fluoroalkyl-modified silicone oil in which some methyl groups are replaced by fluoroalkyl groups. Inter alia, methylphenylsilicone oil, polyether-modified silicone oil, and long chain alkyl-modified silicone oil are preferred.

The diorganopolysiloxane (A) should preferably have a number average molecular weight (Mn) of 250 to 100,000 and more preferably 1,000 to 60,000, as measured by gel permeation chromatography (GPC) versus polystyrene standards. Polysiloxane with a Mn of less than 250 may lead to poor antifouling property whereas polysiloxane with a Mn in excess of 100,000 may give too viscous compositions which are inconvenient to work. Also the diorganopolysiloxane (A) should preferably have a viscosity at 25° C. of 20 to 30,000 mPa-s, and more preferably 50 to 10,000 mPa-s. Polysiloxane having a viscosity of less than 20 mPa-s at 25° C. may lead to poor antifouling property whereas polysiloxane with a viscosity in excess of 30,000 mPa-s may give too viscous compositions which are inconvenient to work. It is noted that the viscosity is as measured at 25° C. by a rotational viscometer.

Desirably, one or multiple members selected from the foregoing silicone oils are used in a total amount of 10 to 300 parts, and preferably 20 to 150 parts by weight per 100 parts by weight of component (C) to be described later. A composition comprising a specific amount of the silicone oil, when used as antifouling paint, tends to form a coating which is excellent in both antifouling property and film strength. Outside the range, a less amount of the silicone oil may lead to poor antifouling and a larger amount may lead to a lowering of film strength.

Component B

Silica serving as component (B) is a filler in the antifouling condensation curing organopolysiloxane composition. It may be either hydrophobic or hydrophilic silica having a BET specific surface area of at least 10 m$^2$/g. The silicas used herein include wet silicas such as silica flour, high purity silica, colloidal silica and calcium silicate, and dry silicas such as spherical silica and fumed silica. Those silicas which have not been surface treated are referred to as hydrophilic silicas while those silicas obtained by surface treatment of the foregoing silicas are referred to as hydrophobic silicas (including hydrophobic wet silicas and hydrophobic dry silicas). Herein, hydrophobic or hydrophilic silica may be used alone or in admixture, and a mixture of hydrophobic and hydrophilic silicas is also acceptable. Silica having a BET specific surface area of less than 10 m$^2$/g may afford a composition with insufficient film strength or rubber strength.

As will be described later, preferably a part or all of silica is heat treated together with a part or all of component (A) prior to mixing with other components; more preferably all of silica is heat treated together with a part or all of component (A), and even more preferably all of silica has been heat treated together with all of component (A).

Specifically, the silica component which can be used herein has the following characteristics. Of silicas (B), wet silicas may generally have an adsorbed water content (moisture content) of about 4 to 8% by weight, a bulk density of 200 to 300 g/L, a primary particle size of 10 to 30 μm, and a specific surface area (BET surface area) of at least 10 m$^2$/g, preferably of the order of 30 to 800 m$^2$/g, and more preferably 50 to 300 m$^2$/g.

Hydrophobic wet silicas are obtained by surface treating wet silicas with organosilicon compounds such as methyltrichlorosilane, dimethyldichlorosilane, hexamethyldisilazane, hexamethylcyclotrisiloxane, and octamethylcyclotetrasiloxane. They take up little moisture over time. They may have a bulk density of 200 to 300 g/L, a primary particle size of 1 to 30 μm, and a specific surface area (BET surface area) of at least 10 m$^2$/g, preferably of the order of 30 to 800 m$^2$/g, and more preferably 50 to 300 m$^2$/g.

Dry silicas generally have a moisture content of not more than 1.5% by weight. Notably, dry silica has an initial moisture content as low as 0.3% by weight or below, for example, immediately after preparation, but as it is allowed to stand in air, it gradually absorbs moisture and increases its moisture content, reaching a moisture content of, say, 0.5 to 1.0% by weight after several months from its preparation. The dry silicas may have a bulk density of 50 to 100 g/L, for example, although the bulk density varies with the type and is not unequivocally determined. They may have a primary particle size of 8 to 20 μm, and a specific surface area (BET surface area) of at least 10 m$^2$/g, preferably of the order of 100 to 400 m$^2$/g, and more preferably 180 to 300 m$^2$/g.

Hydrophobic dry silicas are obtained by surface treating dry silicas with organosilicon compounds such as methyltrichlorosilane, dimethyldichlorosilane, hexamethyldisilazane, hexamethylcyclotrisiloxane, and octamethylcyclotetrasiloxane. They take up little moisture over time and usually have a moisture content of not more than 0.3% by weight and most often 0.1 to 0.2% by weight. They may have a bulk density of 50 to 100 g/L, a primary particle size of 5 to 50 μm, and a specific surface area (BET surface area) of at least 10 m$^2$/g, preferably 30 to 400 m$^2$/g, and more preferably 50 to 300 m$^2$/g.

It is noted that the hydrophobic dry silica which has been heat treated together with component (A), referred to as heat-treated hydrophobic dry silica, has a moisture content of not more than 0.2% by weight, preferably not more than 0.1% by weight, and more preferably 0.05 to 0.1% by weight because moisture adsorbed on the silica surface is physically reduced or removed during the heat treatment. Its bulk density and other physical values are the same as those of hydrophobic dry silicas.

Desirably in the composition, component (B) is generally used in an amount of 0.5 to 100 parts, preferably 1 to 50 parts, and more preferably 3 to 30 parts by weight per 100 parts by weight of component (C) to be described later. A composition comprising a specific amount of silica as component (B) has a good thixotropy and an appropriate viscosity and is advantageously applicable by coating, typically spray coating, to form a thick film even on a vertically extending substrate surface in a single pass, the film having increased film strength and hardness. Outside the range, a less amount of component (B) may fail in providing desired thixotropy or in forming a thick film in a single pass, or in achieving a sufficient film strength and hardness. A composition with a larger amount of component (B) may have an excessively high viscosity and have to be diluted with a thinner or solvent to an appropriate viscosity to apply, failing to form a thick film in a single pass.

Component C

The diorganopolysiloxane serving as component (C) is a base polymer in the inventive anti-fouling condensation curing organopolysiloxane composition. The diorganopolysiloxane has at least two silicon atom-bonded hydroxyl and/or hydrolyzable groups in a molecule. Suitable diorganopolysiloxanes include diorganopolysiloxanes capped with hydroxyl and/or hydrolyzable groups at both ends of their molecular chain, represented by the following general formula (1).

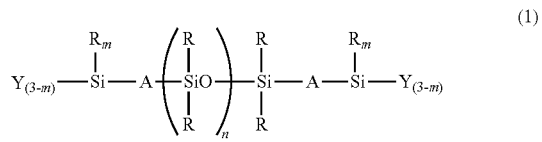

Herein R is independently a substituted or unsubstituted monovalent hydrocarbon group, A is independently an oxygen atom or a divalent hydrocarbon group of 1 to 8 carbon atoms, Y is independently a hydroxyl or hydrolyzable group, m is an integer of 0 to 2, and n is such a number that the diorganopolysiloxane has a viscosity of 20 to 1,000,000 mPa-s at 25° C.

Suitable substituted or unsubstituted monovalent hydrocarbon groups represented by R include alkyl groups such as methyl, ethyl, propyl, butyl, pentyl, hexyl, heptyl, octyl, nonyl, decyl and octadecyl; cycloalkyl groups such as cyclopentyl and cyclohexyl; alkenyl groups such as vinyl, allyl, butenyl, pentenyl and hexenyl; aryl groups such as phenyl, tolyl, xylyl and α- and β-naphthyl; aralkyl groups such as benzyl, 2-phenylethyl and 3-phenylpropyl; and substituted forms of the foregoing groups in which some or all hydrogen atoms are substituted by halogen atoms (e.g., F, Cl and Br) or cyano groups, such as 3-chloropropyl, 3,3,3-trifluoropropyl and 2-cyanoethyl. Of these, methyl, vinyl and phenyl are preferred, with methyl being most preferred.

A is an oxygen atom or a divalent hydrocarbon group of 1 to 8 carbon atoms, examples of which include alkylene groups such as methylene, ethylene, propylene, methylethylene, butylene and hexamethylene, cycloalkylene groups such as cyclohexylene, arylene groups such as phenylene, tolylene and xylylene, substituted forms of the foregoing groups in which some hydrogen atoms are substituted by halogen atoms, and combinations of the foregoing alkylene and arylene groups. Preferably A is oxygen or ethylene.

While Y is independently a hydroxyl or hydrolyzable group, examples of the hydrolyzable group, other than hydroxyl group, situated at ends of the molecular chain of diorganopolysiloxane include alkoxy groups such as methoxy, ethoxy and propoxy; alkoxyalkoxy groups such as methoxyethoxy, ethoxyethoxy and methoxypropoxy; acyloxy groups such as acetoxy, octanoyloxy and benzoyloxy; alkenyloxy groups such as vinyloxy, isopropenyloxy and 1-ethyl-2-methylvinyloxy; ketoxime groups such as dimethylketoxime, methylethylketoxime and diethylketoxime; amino groups such as dimethylamino, diethylamino, butylamino and cyclohexylamino; aminoxy groups such as dimethylaminoxy and diethylaminoxy; and amide groups such as N-methylacetamide, N-ethylacetamide and N-methylbenzamide. Of these, alkoxy is preferred.

While the subscript m is an integer of 0 to 2, it is preferred that m be equal to 2 when Y is a hydroxyl group, and m be equal to 0 or 1 when Y is a hydrolyzable group.

The diorganopolysiloxane (C) should preferably have a viscosity at 25° C. of 20 to 1,000,000 mPa-s, more preferably 100 to 500,000 mPa-s, and even more preferably 1,000 to 50,000 mPa-s. If the diorganopolysiloxane has a viscosity of less than 20 mPa-s at 25° C., it may become difficult to form a coating having good physical and mechanical strength. If the diorganopolysiloxane has a viscosity of more than 1,000,000 mPa-s at 25° C., the composition may have too high a viscosity to work on use.

Illustrative, non-limiting examples of the diorganopolysiloxane (C) are given below.

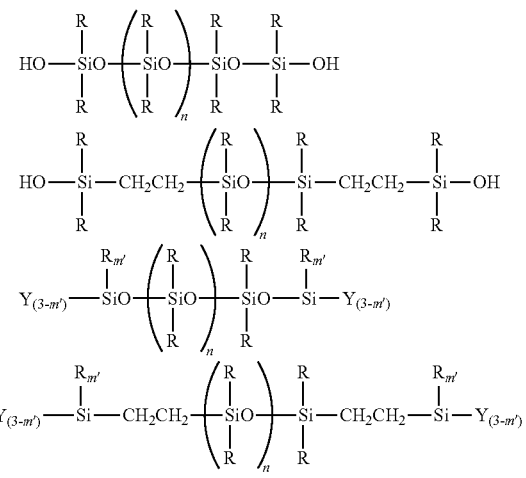

Herein, R and Y are as defined above, n is such a number that the diorganopolysiloxane has a viscosity of 20 to 1,000,000 mPa-s at 25° C., and m' is 0 or 1.

The diorganopolysiloxanes as component (C) may be used alone or in admixture of two or more.

Component D

Component (D) is a silane and/or a partial hydrolytic condensate thereof. It is essential for curing the inventive composition. The silane should have at least two hydrolyzable groups bonded to silicon atoms in a molecule. Typical are silanes of the general formula (2) or partial hydrolytic condensates thereof.

Herein $R^1$ is independently a substituted or unsubstituted monovalent hydrocarbon group of 1 to 6 carbon atoms, X is independently a hydrolyzable group, and "a" is an integer of 0 to 2.

Examples of the hydrolyzable group represented by X are as exemplified for the hydrolyzable group, other than hydroxyl group, situated at ends of the molecular chain of diorganopolysiloxane (C). For X, alkoxy, ketoxime and isopropenoxy groups are preferred.

No particular limits are imposed on the silane or partial hydrolytic condensate as component (D) as long as it has at least two hydrolyzable groups in a molecule. Preferably, at least three hydrolyzable groups are contained in a molecule. A group other than the hydrolyzable group may be bonded to a silicon atom. The molecular structure may be either a silane or siloxane structure. In particular, the siloxane structure may be either straight, branched or cyclic.

The groups, other than the hydrolyzable group, represented by $R^1$ are substituted or unsubstituted monovalent hydrocarbon groups of 1 to 6 carbon atoms, examples of which include alkyl groups such as methyl, ethyl, propyl, butyl, pentyl and hexyl; cycloalkyl groups such as cyclopentyl and cyclohexyl; alkenyl groups such as vinyl, allyl, butenyl, pentenyl and hexenyl; aryl groups such as phenyl and tolyl; aralkyl groups such as benzyl and 2-phenylethyl; and halogenated alkyl groups such as 3-chloropropyl and 3,3,3-trifluoropropyl. Of these, methyl, ethyl, phenyl and vinyl are preferred.

Illustrative, non-limiting examples of the organosilicon compound (D) include ethyl silicate, propyl silicate, methyltrimethoxysilane, methyltriethoxysilane, vinyltrimethoxysilane, vinyltriethoxysilane, methyltris(methoxyethoxy)silane, vinyltris(methoxyethoxy)silane, methyltripropenoxysilane, methyltriacetoxysilane, vinyltriacetoxysilane, methyltri(methylethylketoxime)silane, vinyltri(methylethylketoxime)silane, phenyltri(methylethylketoxime)silane, propyltri(methylethylketoxime)silane, tetra(methylethylketoxime)silane, 3,3,3-trifluoropropyltri(methylethylketoxime)silane, 3-chloropropyltri(methylethylketoxime)silane, methyltri(dimethylketoxime)silane, methyltri(diethylketoxime)silane, methyltri(methylisopropylketoxime)silane, tri(cyclohexanoxime)silane, and partial hydrolytic condensates thereof. They may be used alone or in combination of two or more.

An appropriate amount of component (D) compounded is 0.5 to 20 parts by weight, more preferably 1 to 10 parts by weight per 100 parts by weight of component (C). Less than 0.5 pbw of component (D) may lead to insufficient crosslinking whereas more than 20 pbw of component (B) may result in a cured composition which is too hard and be uneconomical.

Preparation of Composition

The antifouling condensation curing organopolysiloxane composition may be prepared by pre-mixing a part or all of component (A) with a part or all of component (B) to form a premix, while heat treating at a temperature from 50° C. to less than the decomposition temperature of components (A) and (B), preferably about 80 to 300° C., and more preferably about 100 to 200° C., under atmospheric pressure or reduced pressure for a time of about 30 minutes to 3 hours. The premix is then mixed with the remainder of components (A) and (B) and components (C) and (D).

Other Components

In the inventive composition, catalysts may be added for promoting cure. Use may be made of various curing catalysts commonly used in conventional RTV compositions of the condensation curing type. Exemplary catalysts include metal salts of organocarboxylic acids such as lead 2-ethyloctoate, dibutyltin dioctoate, dibutyltin acetate, dibutyltin dilaurate, butyltin 2-ethylhexoate, iron 2-ethylhexoate, cobalt 2-ethylhexoate, manganese 2-ethylhexoate, zinc 2-ethylhexoate, stannous caprylate, tin naphthenate, tin oleate, tin butanoate, titanium naphthenate, zinc naphthenate, cobalt naphthenate, and zinc stearate; organotitanic acid esters such as tetrabutyl titanate, tetra-2-ethylhexyl titanate, triethanolamine titanate and tetra(isopropenyloxy)titanate; organotitanium compounds and chelates such as organosiloxytitanium, β-carbonyltitanium, diisopropoxytitanium bis(ethylacetoacetate) and tetra(acetylacetonato)titanium; alkoxyaluminum compounds; aminoalkyl-substituted alkoxysilanes such as 3-aminopropyltriethoxysilane and N-(trimethoxysilylpropyl)ethylenediamine; amine compounds and salts thereof such as hexylamine and dodecylamine phosphate; quaternary ammonium salts such as benzyltriethylammonium acetate; alkali metal salts of lower fatty acids such as potassium acetate, sodium acetate and lithium bromate; dialkylhydroxylamines such as dimethylhydroxylamine and diethylhydroxylamine; and guanidyl-containing silanes or siloxanes as represented by the following formulae.

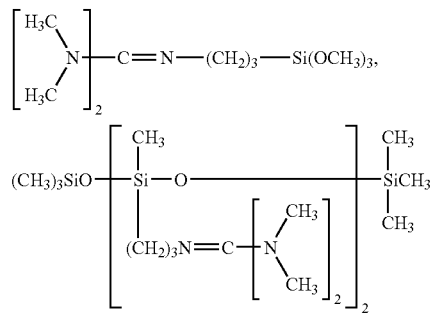

These catalysts may be used alone or in admixture.

When used, the amount of the curing catalyst is not particularly limited. It may be used in a catalytic amount. Typically, the catalyst is preferably used in an amount of 0.01 to 20 parts by weight, more preferably 0.1 to 10 parts by weight per 100 parts by weight of component (C). If the amount of the catalyst, when used, is below the range, the resulting composition may become less curable depending on the type of crosslinking agent. If the amount of the catalyst is above the range, the resulting composition may become less storage stable.

For the reinforcement or extending purpose, fillers may be used in the inventive composition. Suitable fillers include quartz, diatomaceous earth, titanium oxide, aluminum oxide, lead oxide, iron oxide, carbon black, bentonite, graphite, calcium carbonate, mica, clay, glass beads, glass microballoons, shirasu balloons, glass fibers, polyvinyl chloride beads, polystyrene beads, and acrylic beads.

When used, the amount of the filler compounded is preferably 1 to 50 parts by weight and more preferably 5 to 30 parts by weight per 100 parts by weight of component (C) though not limited thereto. When used, an amount below the range of the filler may result in a cured composition with lower rubber physical properties, and an amount beyond the range of the filler may result in a composition having too high a viscosity to work as by mixing and coating.

In the inventive composition, optional additives may be compounded in ordinary amounts as long as the objects of the invention are not compromised. Suitable additives include plasticizers, colorants such as pigments, flame retardants, thixotropic agents, bactericides, fungicides, and adhesion improvers such as carbon-functional silanes having amino, epoxy or thiol groups (e.g., γ-glycidoxypropyl-trimethoxysilane and aminopropyltriethoxysilane).

The composition is used as coating material or paint, especially antifouling paint. The composition has good stability and sufficient thixotropy during preparation, storage and preservation, and can be applied as a thick film or coating in a single pass. The resulting coating exhibits a good balance of rubber physical properties such as hardness, tensile strength and elongation, and improved antifouling property. It is best suited as an antifouling coating. In order that the composition be applied as a thick film or coating in a single pass, the composition should preferably have an appropriate viscosity to apply, specifically a viscosity of not more than 50,000 mPa-s at 25° C., and more preferably not more than 30,000 mPa-s at 25° C.

The inventive composition is applicable to underwater structures to form a coating on their surface. Suitable underwater structures include ships, harbor facilities, buoys, pipe lines, bridges, submarine stations, submarine oil well excavation units, power plant water conduits, fish culture nets and fixed shore nets. The cured coating of the composition is non-toxic and non-detrimental to the environment, and exhibits the antifouling effect of preventing adhesion and growth of aquatic organisms over a long term.

When applied to underwater structures, the coating of the composition typically has a thickness of 10 to 1,000 μm, and especially 50 to 500 μm. The inventive composition may be applied and cured at room or normal temperature.

EXAMPLE

Examples and Comparative Examples are given below for further illustrating the invention although the invention is not limited thereto. All parts are by weight. The viscosity is a measurement at 25° C. by a rotational viscometer. The specific surface area is a measurement by the BET method.

Example 1

A composition was prepared by intimately premixing 30 parts of α,ω-trimethylsiloxy-dimethyldiphenylpolysiloxane having a viscosity of 300 mPa-s with 10 parts of fumed silica which had been surface treated with dimethyldichlorosilane and had a specific surface area of 110 $m^2/g$ and continuing mixing under reduced pressure for 2 hours while heating at 150° C. The premix was further mixed with 100 parts of α,ω-dihydroxy-dimethylpolysiloxane having a viscosity of 1,500 mPa-s, 12 parts of vinyltris(methylethylketoxime)silane and 1 part of γ-glycidoxypropyltrimethoxysilane until uniform.

Example 2

A composition was prepared as in Example 1 except that α,ω-trimethylsiloxy-dimethyl-methylpolyether polysiloxane (HLB 4) having a viscosity of 180 mPa-s was used instead of the α,ω-trimethylsiloxy-dimethyldiphenylpolysiloxane having a viscosity of 300 mPa-s in Example 1.

Example 3

A composition was prepared as in Example 1 except that α,ω-trimethylsiloxy-dimethyl-methylundecyl polysiloxane having a viscosity of 100 mPa-s was used instead of the α,ω-trimethylsiloxy-dimethyldiphenylpolysiloxane having a viscosity of 300 mPa-s in Example 1.

Example 4

A composition was prepared as in Example 1 except that fumed silica having a specific surface area of 130 $m^2/g$ was used instead of the dimethyldichlorosilane-treated fumed silica having a specific surface area of 110 $m^2/g$ in Example 1.

Example 5

A composition was prepared as in Example 1 except that 5 parts of dimethyldichlorosilane-treated fumed silica having a specific surface area of 110 $m^2/g$ and 5 parts of fumed silica having a specific surface area of 130 $m^2/g$ were used instead of 10 parts of the dimethyldichlorosilane-treated fumed silica having a specific surface area of 110 $m^2/g$ in Example 1.

Comparative Example 1

A composition was prepared by intimately premixing 100 parts of α,ω-dihydroxy-dimethylpolysiloxane having a viscosity of 1,500 mPa-s with 10 parts of fumed silica which had been surface treated with dimethyldichlorosilane and had a specific surface area of 110 $m^2/g$ and continuing mixing under reduced pressure for 2 hours while heating at 150° C. The premix was further mixed with 30 parts of α,ω-trimethylsiloxy-dimethyldiphenylpolysiloxane having a viscosity of 300 mPa-s, 12 parts of vinyltris(methylethylketoxime)silane and 1 part of γ-glycidoxypropyltrimethoxysilane until uniform.

Comparative Example 2

A composition was prepared as in Comparative Example 1 except that α,ω-trimethylsiloxy-dimethyl-methylpolyether polysiloxane (HLB 4) having a viscosity of 180 mPa-s was used instead of the α,ω-trimethylsiloxy-dimethyldiphenylpolysiloxane having a viscosity of 300 mPa-s in Comparative Example 1.

Comparative Example 3

A composition was prepared as in Comparative Example 1 except that α,ω-trimethylsiloxy-dimethyl-methylundecyl polysiloxane having a viscosity of 100 mPa-s was used instead of the α,ω-trimethylsiloxy-dimethyldiphenylpolysiloxane having a viscosity of 300 mPa-s in Comparative Example 1.

Comparative Example 4

A composition was prepared as in Comparative Example 1 except that fumed silica having a specific surface area of 130 $m^2/g$ was used instead of the dimethyldichlorosilane-treated fumed silica having a specific surface area of 110 $m^2/g$ in Comparative Example 1.

Comparative Example 5

A composition was prepared as in Comparative Example 1 except that 5 parts of dimethyldichlorosilane-treated fumed silica having a specific surface area of 110 $m^2/g$ and 5 parts of fumed silica having a specific surface area of 130 $m^2/g$ were used instead of 10 parts of the dimethyldichlorosilane-treated fumed silica having a specific surface area of 110 $m^2/g$ in Comparative Example 1.

[Performance Tests]

The test procedures are as follows.
(1) Uncured Physical Properties

A viscosity was measured by a rotational viscometer. A tack-free time was measured according to JIS A-1439.
(2) Cured Physical Properties A composition was molded into a sheet of 2 mm thick and cured at 23° C. and 50% RH for 7 days. Rubber physical properties of the sheet were measured according to JIS K-6249.
(3) Sag A test solution was prepared by mixing 60 g of a composition with 40 g of xylene. Using a sag tester, the test solution was coated to a wet thickness of 250 μm, after which the sample was immediately turned to a vertical attitude. The sag or run of paint was evaluated according to JIS K-5551, Appendix 2.
   Passed: no sag
   Rejected: sag
(4) Bleed
A composition was molded into a sheet of 2 mm thick and cured at 23° C. and 50% RH for 7 days. The weight (initial weight) of the sheet was measured. Then the sheet was immersed in warm water at 50° C. for 2 weeks, taken out, dried and weighed (immersed weight). A percent leach-out was computed according to the equation:

Leach-out (%)=(initial weight−immersed weight)/oil weight×100

Correction was made by using as a blank a composition corresponding to Comparative Example 1 except that α,ω-trimethylsiloxy-dimethyldiphenylpolysiloxane having a viscosity of 300 mPa-s was omitted, determining a weight loss of the blank, and subtracting this weight loss.
(5) Coating Efficiency
A test solution was prepared by mixing 90 g of a composition with 10 g of xylene. A mild steel plate of 100 mm×100 mm×1 mm (thick) was attached to the center of a tin plate of 1000 mm×1000 mm×1 mm (thick). The test solution was applied to the upright plate by airless spraying. It was visually observed whether or not the spray nozzle was clogged. The critical thickness of a coating above which sagging occurred was determined after drying.
(6) Antifouling
An epoxy base anti-corrosion paint was previously coated onto plates to a thickness of 200 µm. Compositions were coated thereon and kept at 23° C. and 50% RH for 7 days for curing to form cured films of 300 µm thick. The thus coated plates were test specimens. In a suspension test, the specimens were suspended at a depth of 1.5 m in seawater offshore Kanagawa, Japan for 24 months. The deposition of shells such as barnacle and seaweed on the specimens was observed and rated as no, some or much deposits.
(7) Shelf Stability
A coating composition as prepared was held in a sealed container at 30° C. for 6 months, after which it was examined for its state and coating efficiency. The composition state (shelf stability) was examined by a visual observation and also by stirring the composition in the opened container and measuring by a grindometer. The coating efficiency was examined by the same test as above.
The results are shown in Tables 1 and 2.

TABLE 1

| | | Example | | | | |
|---|---|---|---|---|---|---|
| | | 1 | 2 | 3 | 4 | 5 |
| Uncured physical properties | Tack-free time, min | 18 | 20 | 20 | 18 | 18 |
| | Viscosity, Pa-s | 17 | 15 | 13 | 17 | 17 |
| Cured physical properties | Hardness (Type A) | 26 | 26 | 27 | 26 | 25 |
| | Elongation, % | 220 | 240 | 230 | 180 | 200 |
| | Tensile strength, MPa | 1.2 | 1.2 | 1.2 | 1.0 | 1.1 |
| Sag | | Passed | Passed | Passed | Passed | Passed |
| Bleed | Leach-out, % | 20 | 22 | 24 | 22 | 20 |
| Coating efficiency | Sprayability | Good | Good | Good | Good | Good |
| | Critical thickness, µm | 250 | 250 | 250 | 200 | 250 |
| Antifouling | 3 months | No deposits | No deposits | No deposits | No deposits | No deposits |
| | 6 months | No deposits | No deposits | No deposits | No deposits | No deposits |
| | 12 months | No deposits | No deposits | No deposits | No deposits | No deposits |
| | 24 months | No deposits | No deposits | No deposits | No deposits | No deposits |
| Shelf stability | State | Good | Good | Good | Good | Good |
| | Sprayability | Good | Good | Good | Good | Good |
| | Critical thickness, µm | 250 | 250 | 250 | 200 | 250 |

TABLE 2

| | | Comparative Example | | | | |
|---|---|---|---|---|---|---|
| | | 1 | 2 | 3 | 4 | 5 |
| Uncured physical properties | Tack-free time, min | 17 | 20 | 20 | 20 | 19 |
| | Viscosity, Pa-s | 16 | 15 | 13 | 15 | 14 |
| Cured physical properties | Hardness (Type A) | 25 | 24 | 25 | 24 | 24 |
| | Elongation, % | 150 | 160 | 160 | 130 | 150 |
| | Tensile strength, MPa | 0.9 | 0.7 | 0.8 | 0.7 | 0.8 |
| Sag | | Rejected | Rejected | Rejected | Rejected | Rejected |
| Bleed | Leach-out, % | 9 | 10 | 8 | 10 | 9 |
| Coating efficiency | Sprayability | Good | Good | Good | Good | Good |
| | Critical thickness, µm | 180 | 150 | 160 | 100 | 120 |
| Antifouling | 3 months | No deposits | No deposits | No deposits | No deposits | No deposits |
| | 6 months | No deposits | Some deposits | Some deposits | No deposits | No deposits |
| | 12 months | Some deposits | Much deposits | Much deposits | Some deposits | Some deposits |
| | 24 months | Much deposits | Much deposits | Much deposits | Much deposits | Much deposits |

TABLE 2-continued

| | | Comparative Example | | | | |
|---|---|---|---|---|---|---|
| | | 1 | 2 | 3 | 4 | 5 |
| Shelf stability | State | Good | Good | Good | Good | Good |
| | Sprayability | Good | Good | Good | Good | Good |
| | Critical thickness, μm | 180 | 120 | 120 | 80 | 100 |

Japanese Patent Application No. 2007-280155 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing an antifouling condensation curing organopolysiloxane composition, said composition comprising 10 to 300 parts by weight of (A) a diorganopolysiloxane selected from the group consisting of methylphenylsilicone oil, polyether-modified silicone oil and long chain alkyl-modified silicone oil, free of a silicon atom-bonded condensation cure reactive group wherein said diorganopolysiloxane has a number average molecular weight of from 250 to 100,000, 0.5 to 100 parts by weight of (B) a hydrophilic and/or hydrophobic silica having a BET specific surface area of at least 10 m²/g, 100 parts by weight of (C) a diorganopolysiloxane having at least two silicon atom-bonded hydroxyl and/or hydrolyzable groups in a molecule having the general formula (1):

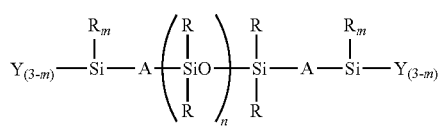

(1)

wherein R is independently a substituted or unsubstituted monovalent hydrocarbon group, A is independently an oxygen atom or a divalent hydrocarbon group of 1 to 8 carbon atoms, Y is independently a hydroxyl or hydrolyzable group, m is an integer of 0 to 2, and n is such a number that the diorganopolysiloxane has a viscosity of 20 to 1,000,000 mPa-s at 25° C., and 0.5 to 20 parts by weight of (D) a silane having at least two hydrolyzable groups in a molecule and/or a partial hydrolytic condensate thereof, having the general formula (2):

(2)

wherein $R^1$ is independently a substituted or unsubstituted monovalent hydrocarbon group of 1 to 6 carbon atoms, X is independently a hydrolyzable group, and "a" is an integer of 0 to 2, and/or a partial hydrolytic condensate thereof, said method comprising the steps of pre-mixing a part or all of component (A) with a part or all of component (B) to form a premix, then mixing the premix with the remainder of component (A), the remainder of component (B), components (C) and (D)

wherein the premixing step includes heating at a temperature from 80° C. to 300° C.

2. The method of claim 1, wherein said diorganopolysiloxane (A) has a number average molecular weight of from 1,000 to 60,000 as measured by gel permeation chromatography.

3. The method of claim 1, wherein said diorganopolysiloxane (A) has a viscosity at 25° C. of 20 to 30,000 mPa-s.

4. The method of claim 1, wherein said silica is a wet silica having a bulk density of 200 to 300 g/L.

5. The method of claim 1, wherein said silica is a wet silica having a primary particle size of 10 to 30 μm.

6. The method of claim 1, wherein said silica is a wet silica having a BET specific surface area of 30-800 m²/g.

7. The method of claim 1, wherein said silica is a wet silica having a BET specific surface area of 50-300 m²/g.

8. The method of claim 1, wherein said silica is a dry silica having a bulk density of 50 to 100 g/L.

9. The method of claim 1, wherein said silica is a dry silica having a primary particle size of 8 to 20 μm.

10. The method of claim 1, wherein said silica is a dry silica having a BET specific surface area of 100-400 m²/g.

* * * * *